US005579194A

United States Patent [19]
Mackenzie et al.

[11] Patent Number: 5,579,194
[45] Date of Patent: Nov. 26, 1996

[54] MOTOR STARTER WITH DUAL-SLOPE INTEGRATOR

[75] Inventors: Raymond W. Mackenzie, Baldwin Borough; Joseph C. Engel, Monroeville, both of Pa.

[73] Assignee: Eaton Corporation, Cleveland, Ohio

[21] Appl. No.: 354,999

[22] Filed: Dec. 13, 1994

[51] Int. Cl.$^6$ ........................................................ H02H 5/04
[52] U.S. Cl. ............................... 361/24; 361/28; 361/94; 341/128; 341/167; 364/483; 364/487
[58] Field of Search .................................. 341/128, 141, 341/167; 363/78–79, 106; 364/481, 483, 487–488, 492, 733, 830; 361/23–25, 28–31, 93, 103, 154, 160; 335/194

[56] References Cited

U.S. PATENT DOCUMENTS

| | | | |
|---|---|---|---|
| 3,806,916 | 4/1974 | Diaz et al. | 341/128 |
| 4,893,102 | 1/1990 | Bauer | 335/132 |
| 5,075,962 | 10/1991 | Alley et al. | 361/24 |
| 5,128,825 | 7/1992 | Hurley et al. | 361/154 |
| 5,270,898 | 12/1993 | Elms et al. | 361/96 |
| 5,315,471 | 5/1994 | Hurley et al. | 361/160 |

*Primary Examiner*—Jeffrey A. Gaffin
*Assistant Examiner*—Michael J. Sherry
*Attorney, Agent, or Firm*—Martin J. Moran

[57] ABSTRACT

A motor starter includes separable contacts interconnected between an alternating current (AC) power source and an AC motor for switching an AC load current which flows from the power source and through the separable contacts; a dual-slope analog-to-digital (A/D) conversion circuit for sensing the load current and generating a current value; and a microcomputer with a coil drive circuit for selectively opening the separable contacts as a predetermined function of the current value. The dual-slope A/D conversion circuit includes current transformers for sensing the AC load current and for selectively providing a received current therefrom, a current reference for selectively providing a reference current, a multiplexer for multiplexing the currents, and a class B preamplifier for amplifying and rectifying the multiplexed AC current. The dual-slope A/D conversion circuit also includes a dual-slope integrator which generates an integration value by positively integrating the received current and by negatively integrating the reference current; a comparator which compares the integration value with a predetermined threshold value and generates a comparison signal for the microcomputer; and a bias amplifier for biasing the current transformers with a voltage which is about equal to a bias voltage of the preamplifier. The preamplifier, the dual-slope integrator, and the bias amplifier may each include a Norton amplifier.

8 Claims, 8 Drawing Sheets

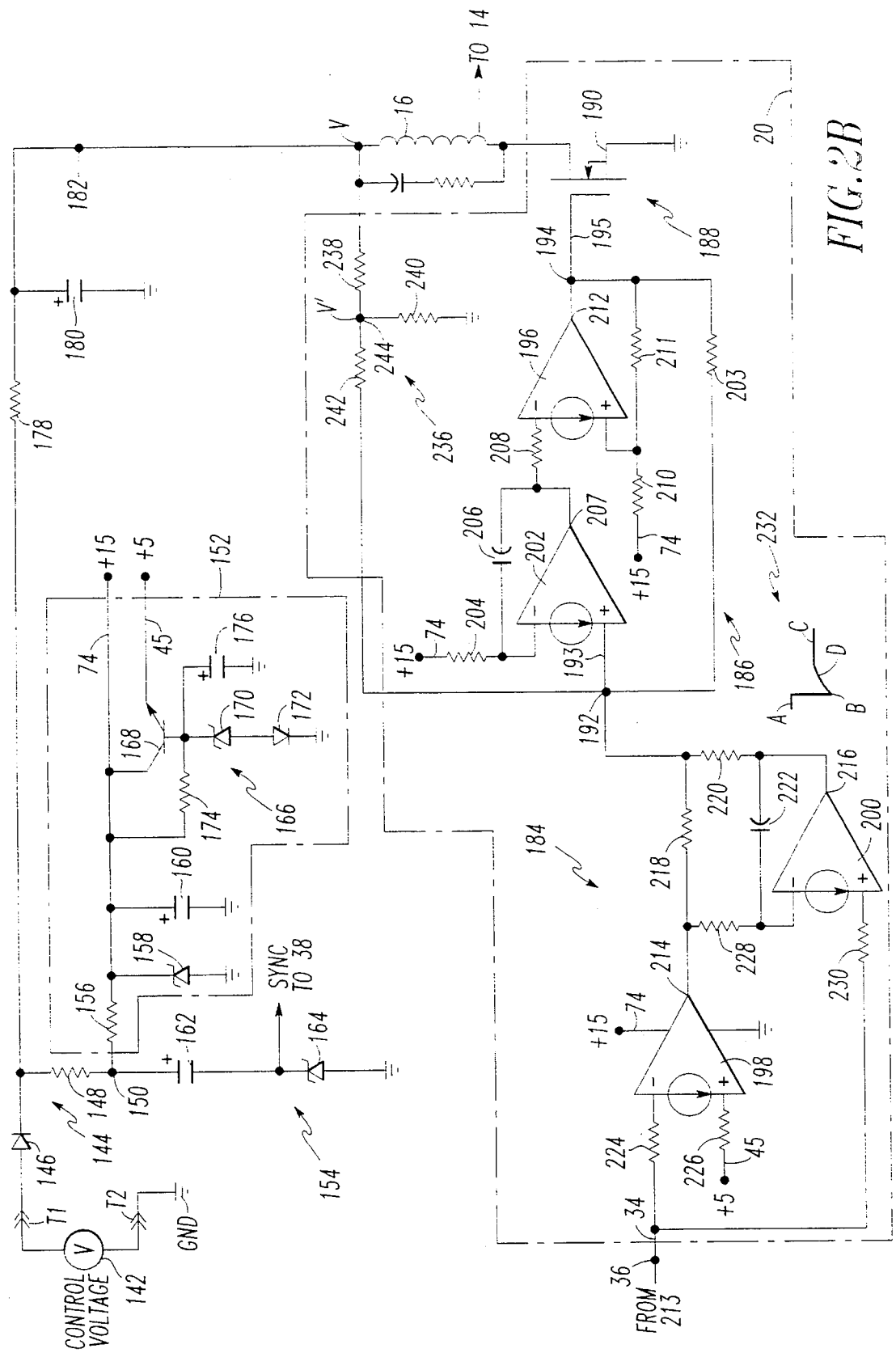

MOTOR STARTER WITH DUAL-SLOPE INTEGRATOR

CROSS REFERENCE TO RELATED APPLICATION

This case is related to copending application Ser. No. 08/281,953 entitled "ELECTROMAGNETIC DEVICE WITH CURRENT REGULATED CLOSURE CHARACTERISTIC" by Rick A. Hurley et al.

BACKGROUND OF THE INVENTION

1. Field of the Invention

This invention relates to a circuit interrupter for a power circuit and, more particularly, to a motor starter which provides low cost current limiting protection for a motor.

2. Background of Information

Circuit interrupters are electrically operated switches used for controlling motors and other types of electrical loads. Circuit interrupters include, for example, contactors, motor starters, motor controllers and other electromechanical switching devices. Electromagnetic contactors, for example, include a plurality of movable electrical contacts which are brought into contact with a plurality of fixed electrical contacts to close the contactor and connect a power line to the load. The movable contacts are separated from the fixed contacts to open the contactor.

Contactors also include a magnetic circuit having an electromagnet and a movable armature with an air gap therebetween when the contactor is opened. An electromagnetic coil is controllable upon command to interact with a source of voltage for electromagnetically accelerating the pole of the armature towards the pole of the electromagnet, thus reducing the air gap. Disposed on the armature are the movable contacts. The complementary fixed contacts are fixedly disposed within the contactor case and engage the movable contacts as the magnetic circuit is energized and the armature is moved. The load and voltage source therefor are interconnected with the fixed contacts and become interconnected with each other as the movable contacts make with the fixed contacts.

A contactor with an overload protection relay system is called a motor starter. The purpose of the overload relay is to estimate the heat produced in the motor by line current and "trip" or stop the motor if the retained heat exceeds an acceptable level. State of the art overload protection relay systems include current sensors which output a voltage proportional to the line current. The current sensor output voltage, in turn, charges a capacitor over one line cycle. As disclosed in U.S. Pat. Nos. 5,270,898 and 5,315,471, the voltage across the capacitor is converted to a digital value by a successive approximation analog-to-digital (A/D) converter. After the A/D conversion, a microprocessor squares and integrates the digital value to achieve a true measure of motor heating.

U.S. Pat. No. 4,893,102 discloses an electromagnetic contactor which controls energization of a contactor coil in four separate stages: (1) an acceleration stage; (2) a coast stage; (3) a grab stage; and (4) a hold stage. When at rest, the contacts are held in a normally open position by the force of a kickout spring disposed within the contactor assembly. In the acceleration stage, the contactor coil is fully energized and the contacts are accelerated toward a closed position at a maximum rate. In the coast stage, the contactor mechanism has already achieved enough velocity to achieve closure, so energization of the contactor coil is reduced or eliminated entirely to reduce the force of contact closure impact to a minimum level. In the grab stage, the system evaluates the closing velocity of the contactor mechanism and adjusts energization of the contactor coil to ensure the contactor mechanism has enough momentum to guarantee contact closure. Finally, in the hold stage, energization of the contactor coil is reduced to a level sufficient to counteract the force of the kickout spring and maintain the contacts in a closed position.

U.S. Pat. No. 5,128,825 is directed to an electromagnetic contactor which accommodates to dynamic conditions of the contactor coil and supply voltage. The contactor gates a first voltage pulse to the coil of the contactor electromagnet at a fixed, preferably full, conduction angle, and monitors the electrical response of the coil, namely the peak current. The conduction angle of the second pulse is then adjusted based upon the peak current produced by the first voltage pulse and the voltage of the first pulse to provide, together with the first voltage pulse, a constant amount of electrical energy to the coil despite variations in coil resistance and supply voltage. The third and subsequent voltage pulses to the coil of the contactor are gated at conduction angles preselected in order that, with constant energy supplied by the first and second voltage pulses, the contacts touch and then seal at a substantially constant point in a selected pulse. Contact closure can occur at the third pulse, or in a large contactor where more energy is required, at a later pulse. Contact touch and sealing consistently occur on declining coil current in order to achieve low impact velocity and reduced contact bounce.

Normally, the third and subsequent pulses are gated to the contactor coil at constant, preselected conduction angles. However, under marginal conditions for closure where the peak current produced by the first voltage pulse is below a predetermined value, a second set of conduction angles is used to gate the third and subsequent voltage pulses to the coil. This second set of conduction angles produces a substantially full conduction of the third and subsequent pulses.

It is known to use a current regulator system in an electromagnetic contactor for regulating coil current to a current reference. It is also known to drive the coil with a field effect transistor (FET) drive circuit. The FET drive circuit is switched by a pulse width modulated (PWM) signal. The PWM signal normally switches current to the coil for a predetermined percentage of the period of the PWM signal. The coil current is sensed and compared to the current reference. Whenever the sensed coil current exceeds the current reference, the PWM signal is disabled. In turn, the FET drive circuit is disabled for the remainder of the period of the PWM signal and, thus, the coil current is regulated to the current reference.

There is a need for an improved circuit interrupter having a reduced cost with respect to prior art circuit interrupters.

There is a more particular need for such a circuit interrupter which simplifies the analog-to-digital conversion circuitry for a plurality of load currents.

There is another more particular need for such a circuit interrupter which simplifies the drive circuitry for the electromagnetic coil.

BRIEF DESCRIPTION OF THE DRAWINGS

A full understanding of the invention can be gained from the following description of the preferred embodiment when read in conjunction with the accompanying drawings in which:

FIGS. 2A–2B are schematic circuit diagrams of a motor starter in accordance with an embodiment of the invention;

SUMMARY OF THE INVENTION

Figure 1:
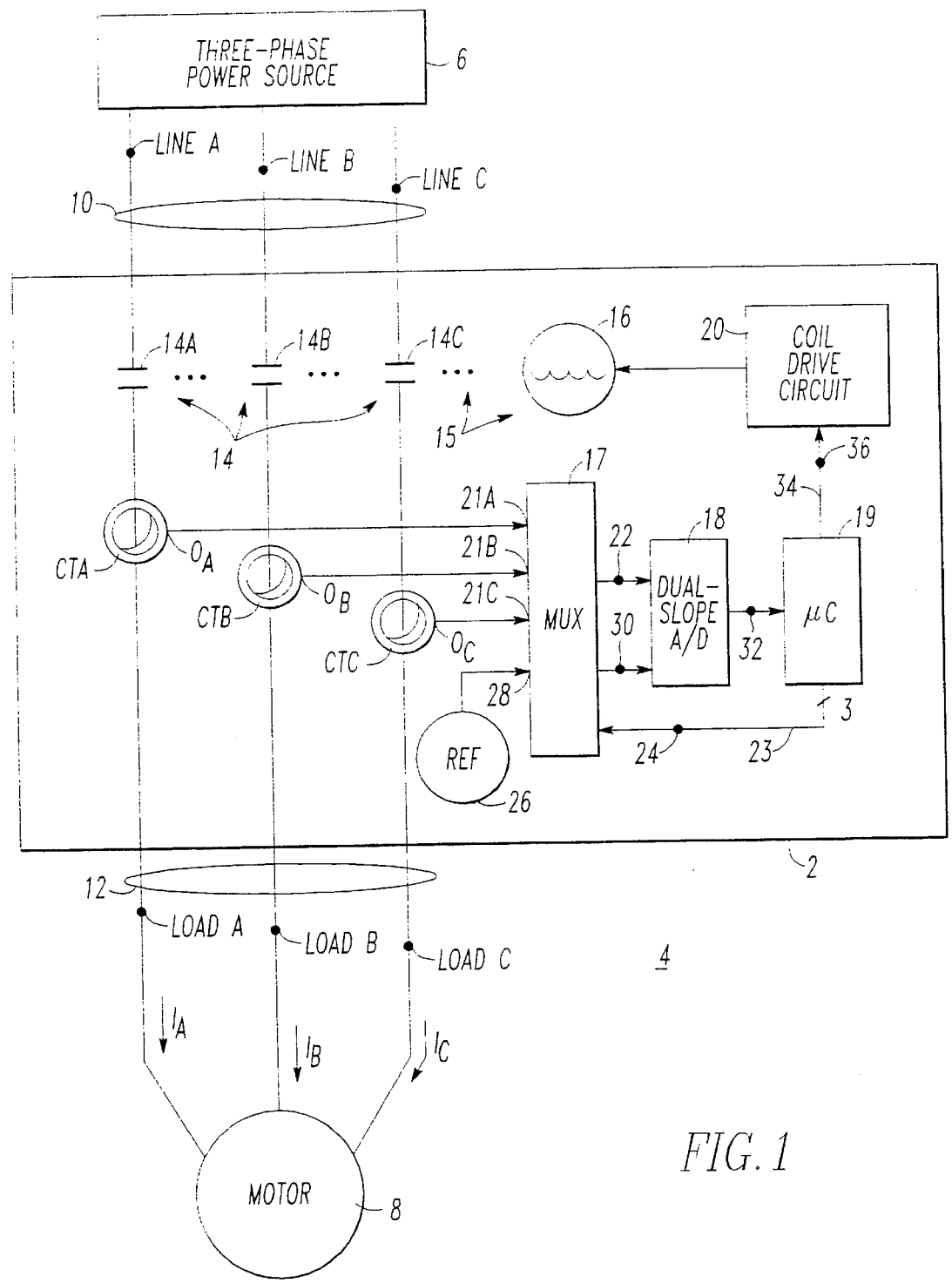
FIG. 1 is a block diagram of a circuit interrupter in accordance with the invention.

These and other needs are satisfied by the invention which is directed to a circuit interrupter apparatus for selectively connecting a power source to a load. The apparatus includes separable contacts interconnected between the power source and the load for switching a load current which flows from the power source and through the separable contacts; a dual-slope conversion mechanism for sensing the load current and generating a current value; and a control mechanism for selectively opening the separable contacts as a predetermined function of the current value in order to disconnect the power source from the load.

The dual-slope conversion mechanism may include a current transformer for sensing the load current and providing a received current; a preamplifier with a bias voltage, the preamplifier buffering the received current and providing a buffered current; a dual-slope integration mechanism for generating the current value from the buffered current; and a bias mechanism for biasing the current transformer with a voltage which is about equal to the bias voltage of the preamplifier. Preferably, the preamplifier, the dual-slope integration mechanism, and the bias mechanism each include a Norton amplifier.

Alternatively, the power source and the load have a plurality of phases, and the apparatus includes plural separable contacts, each of which are interconnected between one of the phases of the power source and a corresponding phase of the load for switching one of a plurality of load currents each of which flows from the power source and through a corresponding one of the separable contacts; plural sensing mechanisms, each of which senses one of the load currents and provides a corresponding received current therefrom; a multiplexer for sequentially multiplexing the received current of each of the sensing mechanisms into a single circuit having a multiplexed current; a reference mechanism for generating a reference current; a dual-slope integration mechanism for positively integrating the multiplexed current and negatively integrating the reference current in order to provide a current value for each of the load currents; and a control mechanism for selectively closing the separable contacts and for selectively opening the separable contacts as a predetermined function of the current value of each of the load currents in order to disconnect the power source from the load.

The control mechanism may include an electromagnetic mechanism having a coil which is energized to close each of the separable contacts and to hold each of the separable contacts closed; a power supply for supplying coil current to energize the coil; a switching mechanism controlled by a processor for selectively switching the coil current to the coil; a capacitor in parallel with the switching mechanism and the coil, the power supply charging the capacitor which supplies a first value of the coil current to the coil in order to pull-in and close each of the separable contacts; and a resistor in series with the coil interconnected between the power supply and the capacitor, the resistor limiting the coil current which flows from the power supply to a second value of the coil current to the coil in order to hold each of the separable contacts closed.

Alternatively, a circuit interrupter apparatus for selectively connecting a power source to a load may include an electromagnetic mechanism having separable contacts and a coil, the separable contacts for selectively connecting the power source to the load, the coil being energized to close the separable contacts and to hold the separable contacts closed; a power supply for supplying coil current to energize the coil; a switching mechanism controlled by an input for selectively switching the coil current to the coil; a pulse width modulation mechanism responsive to an electrical signal to generate at an output a switching signal which is connected to the input of the switching mechanism, the pulse width modulation mechanism controlling the switching mechanism with the switching signal which has an off state with a variable period and an on state with a variable period, the electrical signal having a magnitude which modulates the variable period of the on state, the magnitude having a first value which produces a first period of the on state in order to provide a first value of the coil current to the coil which pull-ins and closes the separable contacts, the magnitude having a second value which produces a second period of the on state in order to provide a second value of the coil current to the coil which holds the separable contacts closed, and the magnitude having a third value which produces a third period of the on state in order to provide a third value of the coil current to the coil which opens the separable contacts; and a control mechanism for controlling the magnitude of the electrical signal of the input of the pulse width modulation mechanism.

DESCRIPTION OF THE PREFERRED EMBODIMENT

Referring to FIG. 1, a block diagram of an exemplary motor-starting contactor or motor starter 2 is illustrated. Electromagnetic contactors are well known in the art. An example of a contactor is disclosed in U.S. Pat. No. 5,315,471, issued May 24, 1994, which is herein incorporated by reference. A complete description of a motor starter is disclosed in U.S. Pat. No. 4,893,102, issued Jan. 9, 1990, which is herein incorporated by reference. The present invention, however, is applicable to a wide variety of electrical switching devices such as, for example, vacuum, air gap and insulating gas contactors, motor starters or motor controllers. The motor starter 2 is configured in an exemplary power circuit 4 having a three-phase alternating current (AC) power source 6 and a three-phase AC load, such as the exemplary AC motor 8, although both AC power circuits having any number of phases and direct current (DC) power circuits may be utilized.

The motor starter 2 selectively connects three power line phases 10 (LINE A,LINE B,LINE C) of the power source 6 to three power inputs 12 (LOAD A, LOAD B,LOAD C, respectively) of the motor 8. The motor starter 2 includes three separable contacts 14 (14A, 14B, 14C) and an electromagnet 15 with a contactor coil 16. The motor starter 2 also includes three current transformers CTA,CTB,CTC, a plural input analog multiplexer (MUX) 17, a dual-slope analog-to-digital (A/D) integration circuit 18, a microcomputer (μC) 19, and a coil drive circuit 20. The separable contacts 14A, 14B, 14C are interconnected between the power line phases LINE A,LINE B,LINE C of the power source 6 and the power inputs LOAD A,LOAD B,LOAD C of the motor 8 in order to switch the AC load currents $I_A,I_B,I_C$, respectively, which flow through the separable contacts 14 from the power lines phases 10.

The current transformers CTA,CTB,CTC sense the AC load currents $I_A,I_B,I_C$ and provide received AC current values on outputs $O_A,O_B,O_C$, respectively. The MUX 17 includes three analog inputs 21A,21B,21C which are interconnected with the outputs $O_A,O_B,O_C$ of the current transformers CTA,CTB,CTC, respectively. The MUX 17 sequentially multiplexes the received current values from the current transformers CTA,CTB,CTC into a multiplexed AC current value on a single circuit 22. The μC 19 selects one of the analog inputs 21A,21B,21C of the MUX 17 for conversion by the dual-slope A/D 18 using three selection signals 23 on three lines 24.

The motor starter 2 also includes a current reference (REF) 26 which generates a reference current for another analog input 28 of the MUX 17. As discussed in greater detail below with FIG. 2A, the dual-slope A/D 18 positively integrates the multiplexed current on the single circuit 22 from an initial value for a predetermined time interval and, then, negatively integrates the reference current on line 30 back to the initial value in order to provide a comparison timing signal to the μC 19 on line 32. In turn, the μC 19 determines a current value for the selected one of the load currents $I_A,I_B,I_C$.

The μC 19 selectively opens and closes the separable contacts 14 as a predetermined function of the current values for each of the load currents $I_A,I_B,I_C$ in order to disconnect the power source 6 from the motor 8. As discussed in greater detail below with FIG. 5C, whenever any one of the current values is above a predetermined current value, the μC 19 outputs a control signal 34 on line 36 to the coil drive circuit 20. The circuit 20 regulates current applied to the contactor coil 16. Whenever the coil 16 is energized, the separable contacts 14 are first closed and then are held closed in order to connect the power source 6 to the motor 8. On the other hand, whenever the coil 16 is deenergized, the separable contacts 14 are opened, thereby disconnecting the power source 6 from the motor 8.

Figure 2A:
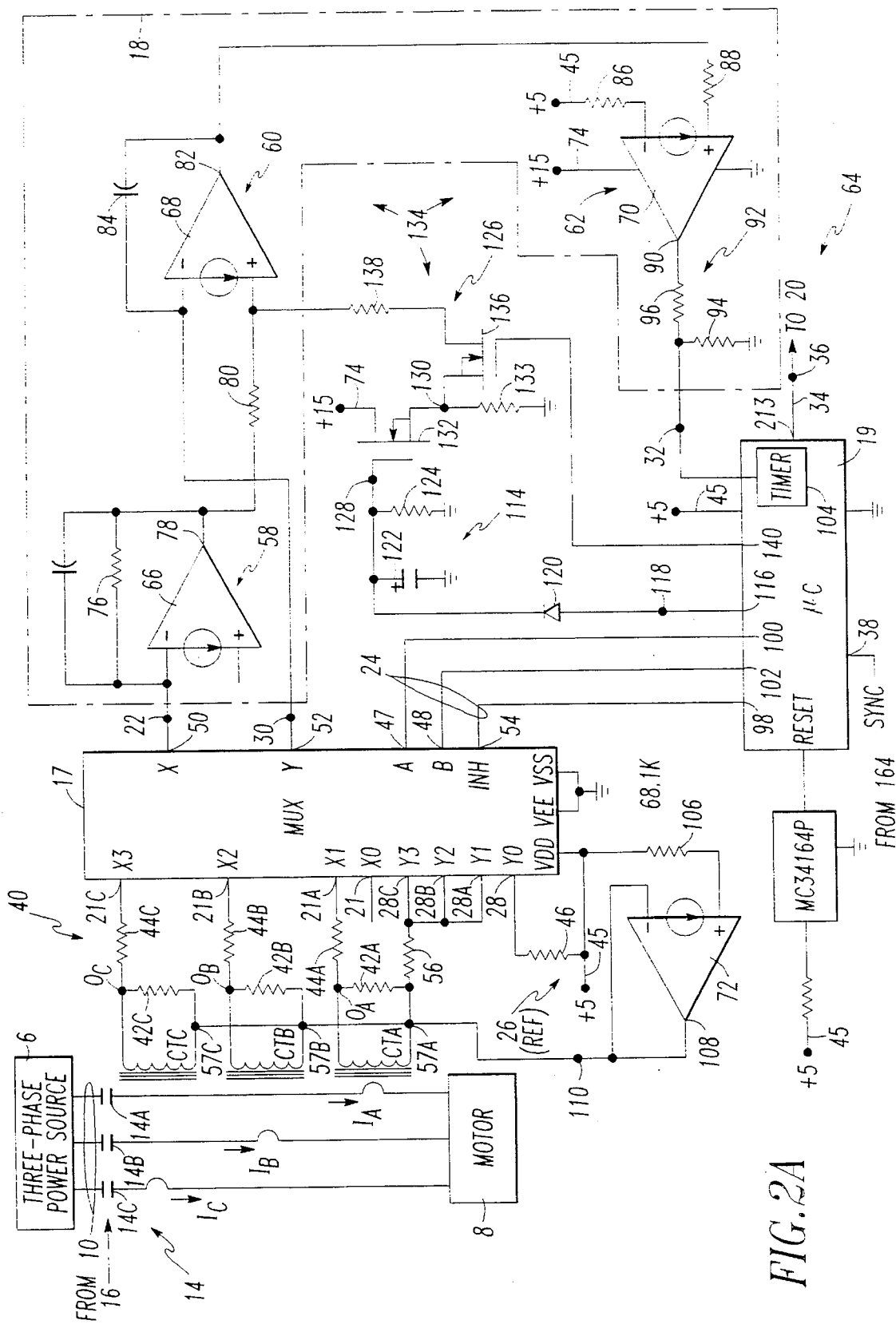

FIGS. 2A–2B illustrate a schematic circuit diagram of the motor starter 2 of FIG. 1. The phases 10 of the exemplary AC power source 6 have a periodic waveform (e.g., 50 Hz, 60 Hz, etc.) with a generally fixed period (e.g., 20 ms, 16.667 ms, etc.). As discussed in greater detail below with FIGS. 2B, 5A and 5B, the μC 19 has a line synchronization digital input 38 with a signal (SYNC) having a period which closely follows the generally fixed period of the power line phases 10. The μC 19 controls the MUX 17 which, in turn, drives the dual-slope A/D 18 in order to provide three sequential dual-slope integrations for the load currents $I_A,I_B,I_C$ of the power line phases 10.

Continuing to refer to FIG. 2A, a sensing mechanism 40 includes the three current transformers CTA,CTB,CTC, the REF 26 and the MUX 17. The current transformers CTA, CTB,CTC sense the AC load currents $I_A,I_B,I_C$ and generate a corresponding voltage across burden resistors 42A,42B, 42C which provide received AC currents through resistors 44A,44B,44C to the inputs 21A,21B,21C, respectively, of the MUX 17. The REF 26 generates a reference current from a +5 power supply 45 through a resistor 46. The exemplary MUX 17 is a dual 4:1 analog multiplexer such as, for example, an MC14052B marketed by Motorola. The MUX 17 has two selection inputs 47,48 which selectively connect one of the four analog inputs 21–21C to the output 50 and which also selectively connect one of the four analog inputs 28–28C to the output 52.

For example, whenever the inputs 47,48 are both logic zero, the analog input 28 (Y0) is connected to the output 52 (Y) and, in turn, to the line 30. Also, the open analog input 21 (X0) is connected to the output 50 (X) and, in turn, to the single circuit 22. The MUX 17 also has an inhibit input 54 which, when logic one, disables the outputs 50,52 in a high impedance state. Otherwise, when the inhibit input 54 is logic zero, the inputs 47,48 are used to select the analog inputs 21,21A,21B,21C for connection to the output 50 and, in the other half of the MUX 17, are used to select the analog inputs 28,28A,28B,28C (Y0–Y3) for connection to the output 52. The analog inputs 28A,28B,28C are connected to a resistor 56 which, in turn, is connected to the ground references 57A,57B,57C of the current transformers CTA, CTB,CTC, respectively.

Whenever the reference current from the REF 26 is applied to the line 30, a zero current from the open input 21 is applied to the single circuit 22. Otherwise, when one of the inputs 21A,21B,21C is selected, a current through the resistor 56 is applied to the line 30. However, if the inhibit input 54 is logic one, then the outputs 50,52 are both driven to a high impedance state and, thus, the received AC currents and the reference current are disabled. The dual MUX 17 preferably provides an equivalent source resistance for the outputs 50,52 in order to prevent an imbalance between the positively integrated multiplexed current on the single circuit 22 and the negatively integrated reference current on the line 30. In this manner, any change of such source resistance (e.g., caused by a temperature change) equivalently affects both of such currents.

The dual-slope A/D 18 includes a preamplifier 58, a dual-slope integrator 60 and a comparator 62. A dual-slope conversion circuit 64 includes the current transformers CTA, CTB,CTC, the REF 26, the MUX 17, the dual-slope A/D 18 and the μC 19. The preamplifier 58, the dual-slope integrator 60 and the comparator 62 include amplifiers 66,68,70, respectively. Preferably, the amplifiers are Norton amplifiers which generally provide a balanced current input between the positive (+) and negative (−) input terminals. Preferably, the exemplary Norton amplifiers 66,68,70 and 72 are included in a quad-amplifier integrated circuit such as, for example, an LM2900 marketed by National Semiconductor or an MC3301 marketed by Motorola. In this manner, the amplifiers 66,68,70 have a consistent input bias voltage which is compensated, as described below, by the amplifier 72. Each of the amplifiers 66,68,70,72 is preferably powered by a single +15 power supply 74 (as shown with the amplifier 70).

The preamplifier 58 has an open positive input (+) terminal with a zero reference current and is, therefore, biased class B in order to half-wave rectify the multiplexed AC value on the single circuit 22 over 180 degrees of the AC waveform. Whenever a "negative" current flows into the output 50 of the MUX 17, the preamplifier 58 sources a positive current from output 78 through feedback resistor 76. On the other hand, when a "positive" current flows from the output 50 of the MUX 17, the preamplifier 58, which has no negative power supply, cannot sink a negative current into the output 78 from the resistor 76. For the negative half-cycle, when the negative current flows into the output 50, the positive voltage at the output 78 of the amplifier 66 sources a rectified current through resistor 80 to the positive input (+) of the amplifier 68 of the dual-slope integrator 60. In this manner, the preamplifier 58 buffers, amplifies and rectifies the multiplexed AC value without requiring additional components for rectification (e.g., a diode bridge). The Norton amplifier 66 permits a dual-slope (ramp-up/ramp-down) integration to be performed with only positive signals thereby eliminating the need for a dual-polarity power supply.

The dual-slope integrator 60 generates a current value as a function of the rectified current from the amplifier 66 at the positive input (+) of the amplifier 68 and the reference current from the output 52 of the MUX 17 at the negative input (−) of the amplifier 68. The dual-slope integrator 60 positively integrates the rectified current for an integral multiple of the generally fixed periods of the line synchronization input 38 of the μC 19. The amplifier 68 has an output 82 which charges and discharges a voltage across an integration capacitor 84 which is connected between the output 82 and the negative input (−) of the amplifier 68. The output 82 provides an integration value which is generated by positively integrating the rectified current from the amplifier 66 and by negatively integrating the reference current from the output 52 of the MUX 17.

The +5 power supply 45 sources a current through the resistor 86 to the negative input (−) of the amplifier 70 and, thus, predetermines a threshold value for the comparator 62. The positive input (+) of the amplifier 70 is connected by a resistor 88 to the output 82 of the amplifier 68 of the dual-slope integrator 60. The output 82 sources a current through the resistor 88 to the positive input (+) of the amplifier 70. The comparator 62 compares the integration value from output 82 of the amplifier 68 with the predetermined threshold value through the resistor 86 in order to generate a comparison signal at the output 90 of the amplifier 70. The output 90 is at a positive voltage during the dual-slope integration when the integration value exceeds the threshold value. Then, at the completion of the ramp-down phase of the dual-slope integration, the output 90 switches to about zero volts after the integration value decreases to the threshold value. The comparison signal at the output 90 is connected to a divider 92 formed by resistors 94,96. The attenuated voltage across the resistor 94, in turn, is input to the μC 19 on line 32 in order to provide the comparison signal thereto. As described in greater detail below with FIG. 5A, the μC 19 provides a control mechanism for receiving the comparison signal from the comparator 62 in order to generate the current value for each of the AC load currents $I_A, I_B, I_C$.

The μC 19 has three digital outputs 98,100,102 that are connected to the inputs 54,47,48 of the MUX 17, respectively. In response to the SYNC signal at the input 38, the output 98 is set to logic zero and at least one of the outputs 100,102 is set to logic one, in order that a corresponding one of the analog inputs 21A,21B,21C (X1–X3) is selected for ramp-up integration at the positive input (+) of the amplifier 68 of the dual-slope integrator 60. At the same time, one of the analog inputs 28A,28B,28C in the other half of the MUX 17 is selected to provide the current through the resistor 56 to the negative input (−) of the amplifier 68. In turn, when the ramp-up integration charges the capacitor 84, the comparison signal on the line 32 switches to logic one.

After an integral number of periods of the SYNC signal at the input 38 of the μC 19, the outputs 100,102 are set to logic zero, in order that the reference current from the REF 26 at the analog input 28 is selected for ramp-down integration at the negative input (−) of the amplifier 68. At the same time, the open analog input 21 is selected to provide a zero current to the negative input (−) of the amplifier 66 and, in turn, to the positive input (+) of the amplifier 68. The μC 19 determines the period of the ramp-down integration using an internal interval timer 104 which measures the time from the beginning of the ramp-down integration to the end thereof as indicated by the transition of the comparison signal on the line 32 to logic zero. Then, after the ramp-down integration, the output 98 is set to logic one in order to drive the outputs 50,52 of the MUX 17 to a high impedance state.

The dual-slope conversion circuit 64 also includes the amplifier 72 which compensates for the input bias voltage (i.e., $V_{BE}$ of an internal current mirror (not shown)) of the amplifier 66 of the preamplifier 58. The positive input (+) of the amplifier 72 is connected to a resistor 106 which conducts a reference current from the 5 power supply 45. The output 108 of the amplifier 72 is connected to the negative input (−) thereof in order to provide a positive voltage to the negative input (−) and source a current which is about equal to the reference current to the positive input (+). The positive voltage at the output 108 is equivalent to the input bias voltage of the amplifiers 66,72. The output 108 of the amplifier 72 is connected by a line 110 to the ground references 57A,57B,57C of the current transformers CTA, CTB,CTC, respectively. In this manner, the outputs $O_A, O_B, O_C$ of the current transformers CTA,CTB,CTC, respectively, are biased by a voltage which is equivalent to the input bias voltage of the negative input (−) of the amplifier 66 of the preamplifier 58.

Accordingly, during a ramp-up integration, whenever one of the current transformers CTA,CTB,CTC senses a corresponding one of the AC load currents $I_A, I_B, I_C$ with a zero value, about a zero voltage is applied across the corresponding one of the resistors 44A,44B,44C in order that the sensed current in the single circuit 22 has a zero value. In a similar manner, about a zero voltage is applied across the resistor 56 in order that the current in line 30 for the negative input (−) of the amplifier 68 of the dual-slope integrator 60 also has a zero value. During the ramp-down integration by the amplifier 68, the negative input (−) of the amplifier 66, which is interconnected with the open input 21 of the MUX 17, and the positive input (+) of the amplifier 66 are both open and, hence, input bias compensation is not required.

At the end of the ramp-down integration, when the μC 19 sets the output 98 to logic one in order to inhibit the received current in the single circuit 22 and the reference current in the line 30, the output 82 of the amplifier 68 of the dual-slope integrator 60 has an equivalent integration value as the integration value at the start of the ramp-up integration (which is equivalent to the integration value at the end of the previous ramp-down integration). In this manner, the dual-slope conversion circuit 64 provides current values which are independent of the predetermined threshold value of the comparator 62. Accordingly, input bias compensation is not required for the amplifier 70 of the comparator 62.

The μC 19 control mechanism also includes a thermal memory 114 for the motor 8. The μC 19 includes a digital output 116 connected to a line 118 having a pulse-width modulated signal which is representative of heating of the motor 8 by the AC load currents $I_A, I_B, I_C$. The thermal memory 114 includes a diode 120 with an anode connected to the line 118 and a cathode connected to a thermal memory capacitor 122. The capacitor 122 is charged by the pulse-width modulated signal from the µC 19 through the diode 120 to a voltage which represents the temperature of the motor 8. The capacitor 122 is connected in parallel with a resistor 124 in order that the voltage of the capacitor 122 discharges through the resistor 124 and represents cooling of the motor 8.

The µC 19 utilizes a voltage follower circuit 126 in order to read the voltage of the capacitor 122 in the thermal memory 114. The voltage follower circuit 126 has an input line 128 connected to the capacitor 122 for inputting the voltage of the thermal memory 114 and an output line 130 having a voltage which follows the voltage of the thermal memory 114. The voltage follower circuit 126 includes a field effect transistor (FET) 132 having a gate connected to the input line 128, a drain connected to the +15 power supply 74, and a source connected to a resistor 133. The FET 132 is, thus, configured as a source follower. An intermediate voltage at the output 130 follows the voltage of the thermal memory 114 and is reproduced across the resistor 133. Preferably, the resistor 133 is selected to provide a near zero temperature coefficient for the FET 132.

The voltage follower circuit 126 is connected to a dual-slope analog input circuit 134 having an FET 136, a resistor 138, the dual-slope integrator 60 and the comparator 62. The source of the FET 136 is connected to the output 130 of the voltage follower circuit 126. The gate of the FET 136 is connected to a digital output 140 of the µC 19. In this manner, the intermediate voltage at the output 130 is switchable by the µC 19 to the drain of the FET 136. The drain of the FET 136 is connected to the resistor 138 which, in turn, is connected to the positive input (+) of the amplifier 68 of the dual-slope integrator 60. As discussed in greater detail below with FIG. 5B, the µC 19 uses the output 140 to begin a dual-slope conversion of the voltage of the capacitor 122 of the thermal memory 114. This voltage is followed by the intermediate voltage at the output 130 of the voltage follower circuit 126 and, in turn, produces a current through the resistor 138 when the FET 136 is enabled by the output 140.

Referring to FIG. 2B, an external control voltage 142 (e.g., a line voltage) is connected to two terminals T1,T2. The control voltage 142 is derived by an external transformer (not shown) from the power line phases 10 of FIG. 2A. The control voltage 142 has a period which is about equal to the period of the phases 10. The terminal T2 is connected to an internal ground reference GND. The terminal T1 is connected to a charging mechanism 144 formed by the series combination of a diode 146 and a resistor 148. The anode of the diode 146 receives the control voltage 142 from the terminal T1. The diode 146, during positive half-cycles of the control voltage 142, produces a charging current through the resistor 148 to a line 150 which is connected to a power supply circuit 152 and a synchronization circuit 154.

The power supply circuit 152 produces the +15 power supply 74 and the +5 power supply 45. The line 150 is connected to a resistor 156 which, in turn, is connected to the parallel combination of a zener diode 158 and a capacitor 160. The line 150 is also connected to the series combination of a power supply filter capacitor 162 and a zener diode 164. Current from the line 150 charges the capacitor 162 which, in turn, discharges through the resistor 156. During each positive half-cycle of the control voltage 142, the charging current from the line 150 passes through the capacitor 162 and produces a pulsed SYNC signal across the zener diode 164. The cathode of the zener diode 164 is connected to the input 38 of the µC 19 of FIG. 2A which receives the SYNC signal. The synchronization circuit 154, thus, provides a signal for synchronizing the µC 19 with the phases 10 of FIG. 2A. As discussed in greater detail below with FIG. 5A, the µC 19 uses the SYNC signal to measure the time of an integral number of periods of the control voltage 142 and, hence, the phases 10.

The parallel combination of the zener diode 158 and the capacitor 160 produces the +15 power supply 74 thereacross with respect to the ground GND. The power supply circuit 152 also includes a series regulator circuit 166 having a series pass transistor 168. The collector of the transistor 168 is connected to the +15 power supply 74 and the emitter of the transistor 168 is connected to the +5 power supply 45. The series combination of a zener diode 170 and a diode 172 is connected between the base of the transistor 168 and ground GND. An emitter-base resistor 174 provides a suitable current to the series combination of the zener diode 170 and the diode 172 in order to produce a base voltage with a balanced temperature coefficient. A filter capacitor 176 is connected to the base of the transistor 168 in order to filter AC components from the +15 power supply 74 and provide a relatively constant base voltage for the transistor 168. In this manner, the dual-slope A/D 18 of FIG. 2A is powered by a relatively simple, single polarity power supply circuit 152 including the +15 power supply 74 and the +5 power supply 45.

The cathode of the diode 146 is connected to a resistor 178 which, in turn, is connected to a shunt capacitor 180. The capacitor 180 provides a voltage on line 182 for the coil 16 which is energized to close and hold the separable contacts 14 of FIG. 2A closed. The coil drive circuit 20 includes a modulation circuit 184, a pulse width modulation (PWM) circuit 186, and a switching circuit 188. The switching circuit 188 includes an FET 190 which selectively switches current from the line 182 in order to supply coil current to energize the coil 16.

The PWM circuit 186 has an input 192 with an electrical signal 193 and an output 194 with a switching signal 195 connected to the gate of the FET 190. Whenever the switching signal 195 is driven to a sufficiently positive on state voltage by an amplifier 196, the FET 190 switches current from the line 182 through the coil 16. On the other hand, when the switching signal 195 is driven to an off state of about zero volts (GND) by the amplifier 196, the FET 190 is turned off. In this manner, the PWM circuit 186 controls the switching circuit 188 with the switching signal 195. As discussed in greater detail below, the switching signal 195 has a variable length on state and a variable length off state. The amplifier 196 and amplifiers 198,200,202 are Norton amplifiers similar to the amplifiers 66–72 of FIG. 2A, although any type of amplifier may be used. The amplifiers 196,202 form an oscillator which produces the switching signal 195 at the output 194.

A resistor 204 is connected between the +15 power supply 74 and the negative input (−) of the amplifier 202 and provides a relatively constant reference current thereto. A capacitor 206, which is connected between the output 207 and negative input (−) of the amplifier 202, is discharged (charged) whenever the current of the positive input (+) is less (greater) than the reference current of the amplifier 202. The output 207 of the amplifier 202 is connected by a resistor 208 to the negative input (−) of the amplifier 196. A resistor 210 is connected between the +15 power supply 74 and the positive input (+) of the amplifier 196 and a resistor 211 is connected between this positive input (+) and the output 212 of the amplifier 196. The resistors 210,211 provide a first reference current when the output 212 is at ground (GND) and a second reference current, which is greater than the first reference current, when the output 212 is positive. When the voltage at the output 207 of the amplifier 202 falls below a first threshold voltage which causes the current of the negative input (−) of the amplifier 196 to fall below the first reference current, the output 212 changes state from ground (GND) to a positive voltage. In turn, the output 212 sources additional current through the feedback resistor 203 to the positive input (+) of the amplifier 202 which, in turn, causes the output 207 to charge the capacitor 206. When the voltage at the output 207 of the amplifier 202 rises above a second threshold voltage which causes the current of the negative input (−) of the amplifier 196 to exceed the second reference current, the output 212 changes state from the positive voltage to ground (GND).

The PWM circuit 186 outputs the oscillating switching signal 195 with a duty cycle dependent upon the current of the positive input (+) of the amplifier 202 from the input 192. For relatively large currents in the input 192, the amplifier 202 more quickly charges the capacitor 206 and, hence, the amplifier 196 more quickly switches to the off state (GND). For relatively small currents in the input 192, the amplifier 202 more quickly discharges the capacitor 206 and, hence, the amplifier 196 more quickly switches to the on state (positive). Accordingly, a relatively low current to the input 192 provides a relatively large duty cycle (i.e., the on state period divided by the sum of the on and off state periods of the switching signal 195 at the output 194). In contrast, a relatively high current to the input 192 provides a relatively low duty cycle (e.g., a constant off state of the signal 195 which maintains the off state of the FET 190 and, thus, produces zero coil current in the coil 16).

The modulation circuit 184 modulates the electrical signal 193 at the input 192 of the PWM circuit 186. The magnitude of the electrical signal 193 modulates the variable period of the on state and, thus, the modulates the duty cycle of the switching signal 195 of the output 194 of the PWM circuit 186. The modulation circuit 184 includes the amplifiers 198,200. The μC 19 of FIG. 2A uses a digital output 213 to output the control signal 34 on the line 36 to the coil drive circuit 20. Whenever the signal 34 is logic zero, the output 214 of the amplifier 198 is driven positive and the output 216 of the amplifier 200 is driven to ground (GND). The amplifier 198 level shifts the logic zero state of the signal 34 in order to inhibit the oscillator formed by the amplifiers 196,202 and disable the FET 190. The outputs 214,216 of the amplifiers 198,200 are summed by the resistors 218,220, respectively, in order to provide an output current to the input 192 of the PWM circuit 186. With the signal 34 at logic zero, the input current to the input 192 is at a maximum positive current (A) in order that the output 194 of the PWM circuit 186 is constantly driven to ground (GND) in order the switching signal 195 has a zero duty cycle (i.e., a 0% on state and a 100% off state). In this manner, the FET 190 is switched off and sinks zero coil current from the coil 16, thus, maintaining the open state of the separable contacts 14 of FIG. 2A.

Whenever the μC 19 of FIG. 2A switches the signal 34 to logic one, the output 214 of the amplifier 198 is driven to ground (GND). In turn the output 216 of the amplifier 200 begins to charge the capacitor 222. Immediately after the transition of the signal 34 to logic one, the voltage at the outputs 214,216 is ground (GND) and the input current to the input 192 of the PWM circuit 186 is at a minimum current (B). In turn, the output 194 of the PWM circuit 186 provides the switching signal 195 with an exemplary 75% on state and an exemplary 25% off state. In this manner, the FET 190 is periodically switched on and off in order to provide a closing current to the coil 16 which pulls-in and closes the separable contacts 14 of FIG. 2A.

Thereafter, when the amplifier 200 charges the capacitor 222, the input current to the input 192 of the PWM circuit 186 is driven to an intermediate current (C) which is between the minimum (B) and maximum (A) currents. In this manner, the output 194 of the PWM circuit 186 provides the switching signal 195 with an exemplary 25% on state and an exemplary 75% off state. In turn, the FET 190 is periodically switched on and off in order to provide a holding current to the coil 16 which holds the separable contacts 14 of FIG. 2A. The exemplary holding current is about one third of the magnitude of the closing current. The time required to change between the minimum current (B) and the intermediate current (C) is controllable by altering the value of the capacitor 222 and/or the value of the resistor 230.

The amplifier 198 has a resistor 224 connected between the negative input (−) thereof and the output 213 of the μC 19. The amplifier 198 also has a resistor 226 connected between the positive input (+) thereof and the +5 power supply 45 in order to provide a reference current thereto. The output 214 of the amplifier 198 is ground (GND) when the output 213 is logic one and is a positive voltage otherwise. The amplifier 200 has a resistor 228 connected between the negative input (−) thereof and the output 214 of the amplifier 198. The amplifier 200 also has a resistor 230 connected between the positive input (+) thereof and the output 213 of the μC 19. When the output 213 is logic zero and the output 214 of the amplifier 198 is a positive voltage, the output 216 of the amplifier 200 is ground (GND). Otherwise, when the output 213 is logic one and the output 214 is ground (GND), the output 216 of the amplifier 200 charges the capacitor 222 as discussed above. In response, the modulation circuit 184 generates a magnitude profile 232 for the electrical signal 193 to the input 192 of the PWM circuit 186. The magnitude profile 232 has a plurality of values including the exemplary current values A,B,C as well as other values such as the current D which is between the minimum current B and the intermediate current C. Preferably, the current through the resistor 228 is greater than the current through the resistor 230 in order that the discharge time of the capacitor 222 is less than its charge time. In this manner, when the output 213 is switched to logic zero and the modulation circuit 184 is turned off, the circuit 184 is prepared to deliver the minimum current B in the event the output 213 is rapidly switched back to logic one and the circuit 184 is turned back on.

Figure 3:
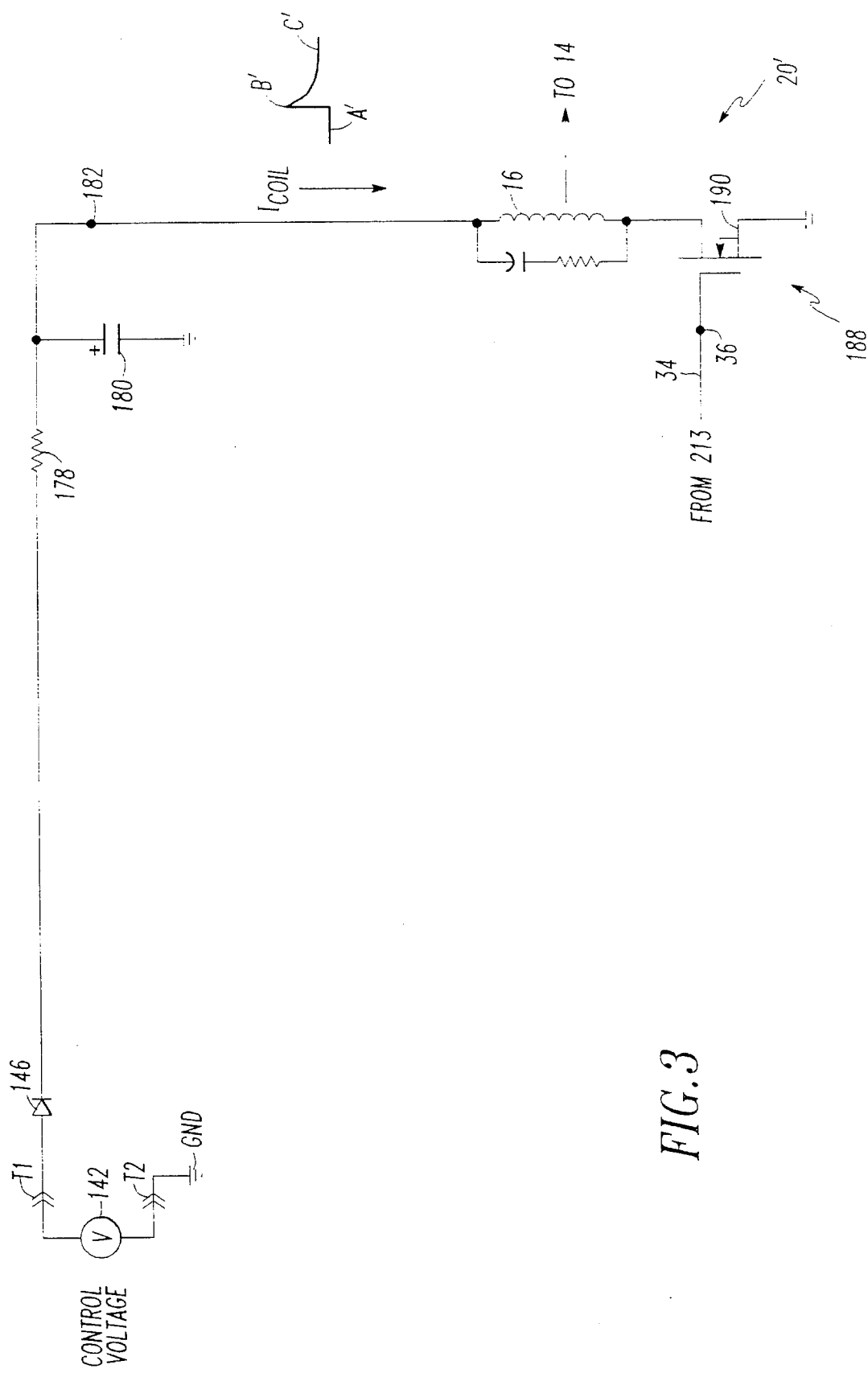
FIG. 3 is a schematic circuit diagram of a coil drive circuit in accordance with an alternative embodiment of the invention.

Referring to FIG. 3, an alternative coil drive circuit 20' is illustrated. The gate of the FET 190 is directly connected by the line 36 to the output 213 of the μC 19 of FIG. 2A. The FET 190 is controlled by the μC 19 in order to selectively switch coil current $I_{COIL}$ to the coil 16. The capacitor 180 is in parallel with the series combination of the FET 190 and the coil 16. The control voltage 142 charges the capacitor 180 through the series combination of the diode 146 and the resistor 178. Whenever the signal 34 is logic zero, the FET 190 is turned off, the coil current $I_{COIL}$ is zero (A'), and the separable contacts 14 of FIG. 2A are open. Whenever the signal 34 is switched to logic one, the FET 190 is turned on, and the capacitor 180 sources a closing current (B') to the coil 16 in order to pull-in and close the separable contacts 14. Thereafter, the resistor 178, which is in series with the coil 16 between the cathode of the diode 146 and the capacitor 180, limits the coil current $I_{COIL}$, which flows from the control voltage 142 and through the diode 146, to a holding current (C') which is less than the closing current (B').

The signal 34 is a binary logic signal with a logic one state and a logic zero state. The logic one state of the signal 34 corresponds to the closing current (B') and the holding current (C'). The logic zero state of the signal 34 corresponds to the zero current (A'). The logic one state of the signal 34 produces a 100% on state and a 0% off state of the FET 190 in order to constantly enable the coil current $I_{COIL}$. The logic zero state produces a 100% off state and a 0% on state of the FET 190 in order to constantly disable the coil current $I_{COIL}$.

Referring again to FIG. 2B, the PWM circuit 186 generally provides open loop control independent of the coil current to the coil 16. The control voltage 142 supplies a voltage V to the coil 16. The exemplary coil drive circuit 20 includes a feedback circuit 236 having resistors 238,240, 242. The voltage V is an electrical parameter of the coil 16 which directly affects the magnitude of the coil current. The resistors 238,240 divide the voltage V and provide a voltage V' at their common node 244. A resistor 242 is connected between the node 244 and the positive input (+) of the amplifier 202.

Whenever the voltage V increases, the voltage V' also increases and, hence, additional current is supplied to the positive input (+) of the amplifier 202. This additional current, as discussed above, reduces the on state period of the switching signal 195 at the output 194 of the PWM circuit 186. On the other hand, when the voltage V decreases, the voltage V' also decreases and, thus, less current is supplied to the positive input (+) of the amplifier 202. In turn, the on state period of the switching signal 195 at the output 194 of the PWM circuit 186 increases. In this manner, the feedback circuit 236 adjusts the magnitude of the electrical signal 193 as a function of the voltage V of the coil 16 in order that the PWM circuit 186 provides less (additional) duty cycle drive to the FET 190 for larger (smaller) values of the control voltage 142.

Figure 4:
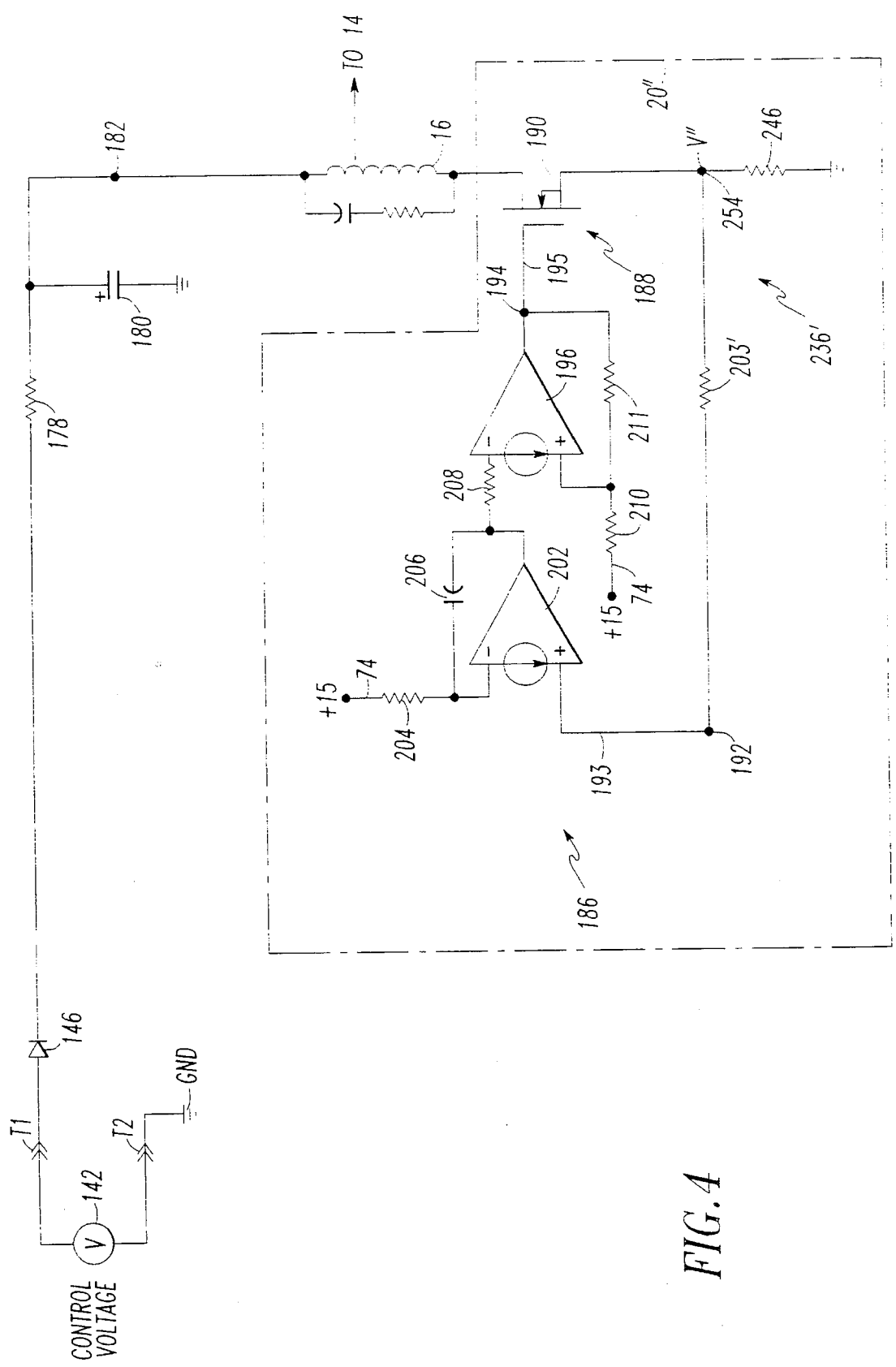
FIG. 4 is a schematic circuit diagram of another coil drive circuit in accordance with another embodiment of the invention.

Referring to FIG. 4, another coil drive circuit 20" is illustrated. The circuit 20" is similar to the circuit 20 of FIG. 2B, except that an alternative feedback circuit 236' having resistors 203' and 246 is provided. The resistor 246 is connected in series with the FET 190 and the coil 16. The coil current passes through the resistor 246 and produces thereacross the voltage V", which is proportional to the coil current, at the node 254 between the source of the FET 190 and the resistor 246. The resistor 203' is connected between the node 254 and the positive input (+) of the amplifier 202.

Whenever the coil current and the voltage V" increase, additional current is supplied to the positive input (+) of the amplifier 202. This reduces the on state period of the switching signal 195 at the output 194 of the PWM circuit 186. On the other hand, when the coil current and the voltage V" decrease, less current is supplied to the positive input (+) of the amplifier 202. This increases the on state period of the switching signal 195 at the output 194 of the PWM circuit 186. In this manner, the feedback circuit 236' adjusts the magnitude of the electrical signal 193 as a function of the coil current of the coil 16 in order that the PWM circuit 186 provides less (additional) duty cycle drive to the FET 190 for larger (smaller) values of the coil current which is dependent upon, for example, the control voltage 142.

Figure 5A:
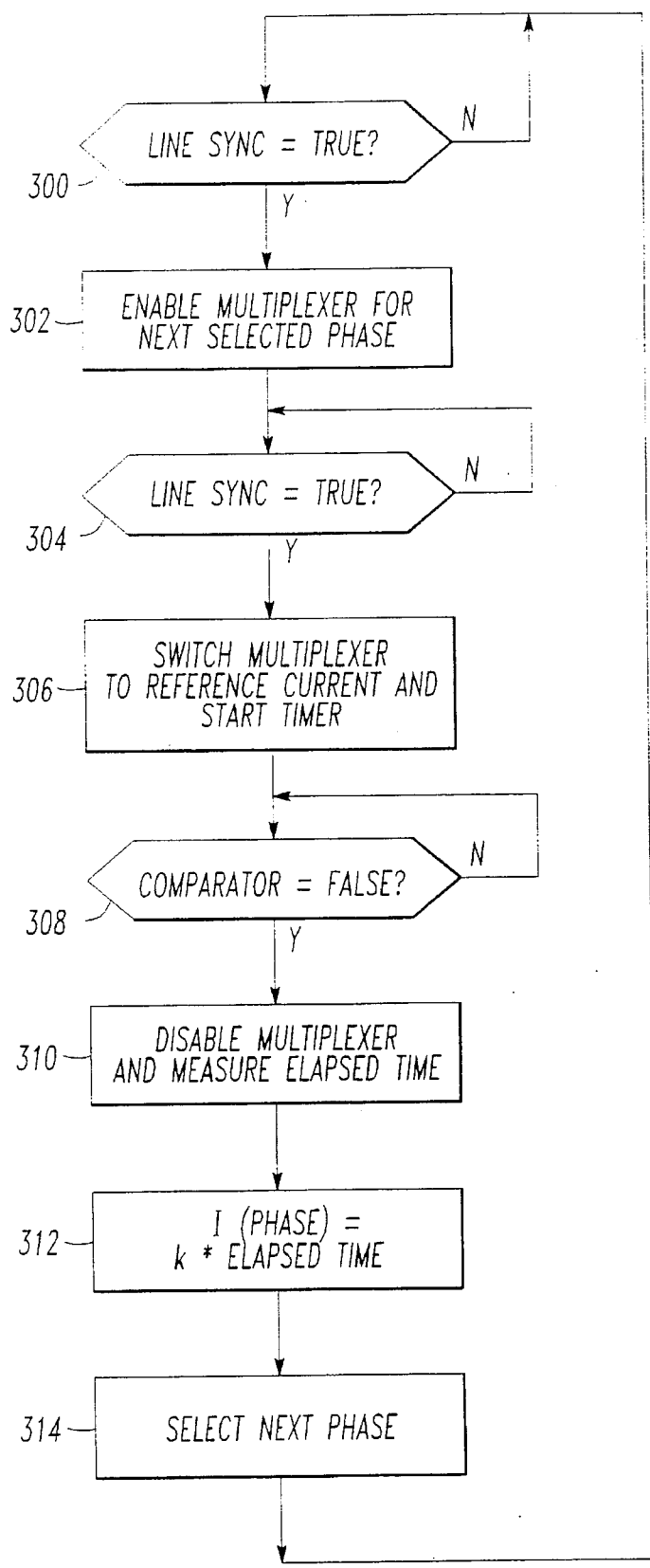
FIG. 5A is a flowchart of microcomputer firmware for performing dual-slope integration of three-phase load currents and generating corresponding current values in accordance with the invention.

FIG. 5A illustrates a flowchart of firmware for the µC 19 of FIG. 2A. As discussed above with FIG. 2A, the µC 19 performs dual-slope integration of the exemplary three-phase AC load currents $I_A,I_B,I_C$ and generates corresponding current values therefrom. At step 300, the µC 19 tests the SYNC signal at the line synchronization input 38. When the SYNC signal is logic one or true, at step 302, the µC 19 enables the MUX 17 (e.g., sets output 100 true and outputs 98,102 false) for the next selected one of the phases 10 (e.g., LINE A) which begins the ramp-up portion of the dual-slope integration by the dual-slope A/D 18. At step 304, the µC 19 tests the SYNC signal. When the SYNC signal is true, after one period of the control voltage 142 of FIG. 2B, the µC 19 switches the MUX 17 to the reference current (sets outputs 98,100,102 false) and starts the timer 104 at step 306, although any integral number of line cycles of the control voltage 142 may be timed by the SYNC signal or an equivalent time may be provided by a separate timing mechanism (e.g., the internal timer 104). In this manner, each current value measurement is independent of the phase of the AC load currents $I_A,I_B,I_C$ thereby facilitating comparison of the measured current values in order to detect loss of phase.

At step 308, the µC 19 tests the comparison signal on the line 32 from the comparator 62. When the comparison signal is logic zero or false, the µC 19 disables the MUX 17 (sets output 98 true) and measures the elapsed time of the ramp-down period from the internal timer 104 at step 310. Then, at step 312, the AC load current (e.g., $I_A$) is calculated from a predetermined constant (k) times the elapsed time. Then, at step 314, the µC 19 selects (e.g., setting output 102 true and output 100 false) the next selected one of the phases 10 (e.g., LINE B) before repeating step 300. In the exemplary embodiment, the ramp-down period is selected to be less than one line cycle of the control voltage 142, although any ramp-down period which is less than any integral number of line cycles of the control voltage 142 may be provided. Also in the exemplary embodiment, the three dual-slope integrations of the phases 10 are sequentially performed over six line cycles, although dual-slope integrations of the phases 10 may be performed over any integral number of line cycles.

Figure 5B:
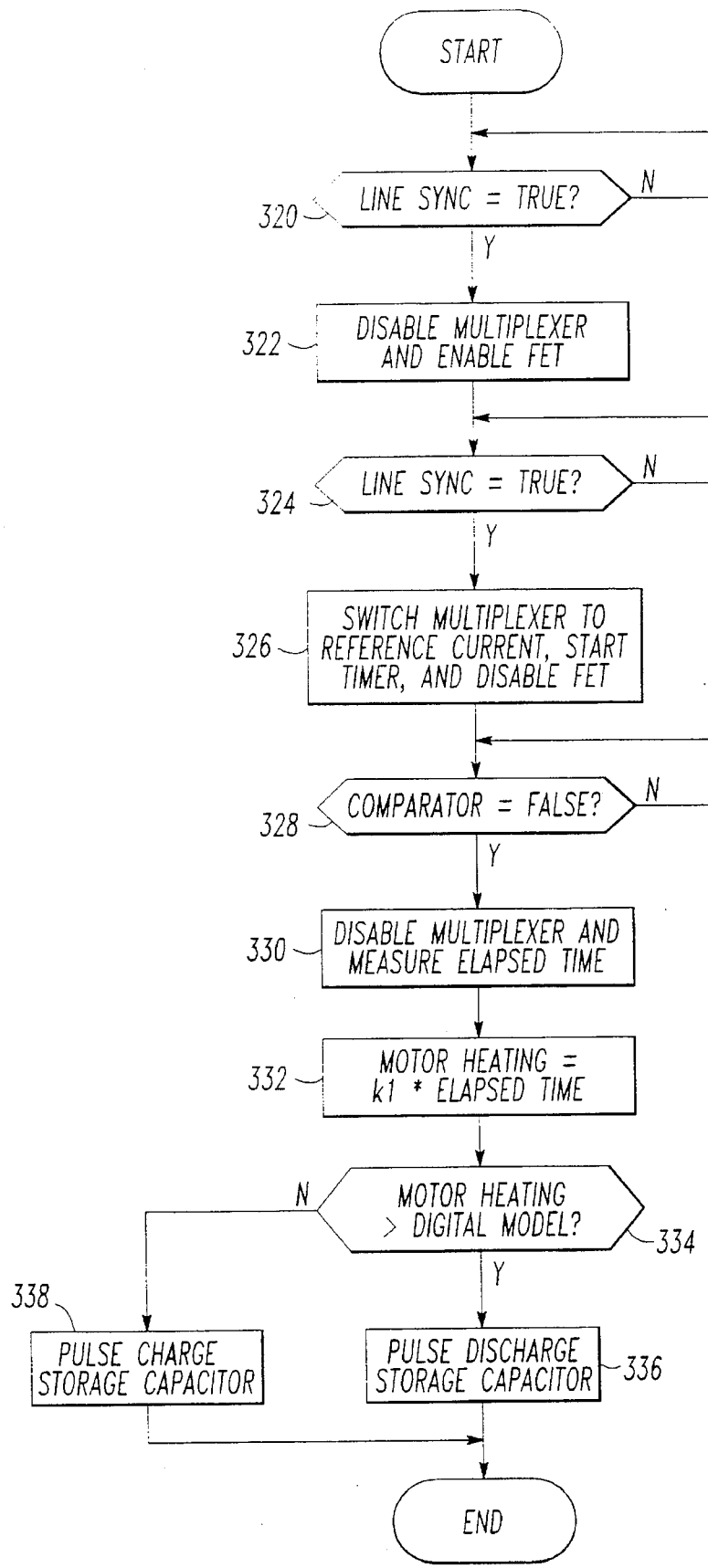
FIG. 5B is a flowchart of microcomputer firmware for performing dual-slope integration of a thermal memory voltage in accordance with the invention.

FIG. 5B illustrates another flowchart of firmware for the µC 19 of FIG. 2A. A "motor heating" value is stored on the capacitor 122 as an analog voltage representative of a calculated digital model generated by the µC 19 as discussed below with FIG. 5C. As discussed above with FIG. 2A, in a similar manner to FIG. 5A, the µC 19 performs a dual-slope integration of the voltage of the exemplary thermal memory 114 and generates a corresponding voltage value therefrom. At step 320, the µC 19 tests the SYNC signal on the line synchronization input 38. When the SYNC signal is true, at step 322, the µC 19 disables the MUX 17 (sets output 98 true) and enables the FET 136 (sets output 140 true) which begins the ramp-up portion of the dual-slope integration by the dual-slope A/D 18. At step 324, the µC 19 tests the SYNC signal. When the SYNC signal is true, after one period of the control voltage 142 of FIG. 2B, the µC 19 switches the MUX 17 to the reference current (sets outputs 98,100,102 false), disables the FET 136 (sets output 140 false), and starts the timer 104 at step 326.

At step 328, the µC 19 tests the comparison signal on line 32 from the comparator 62. When the comparison signal is false, the µC 19 disables the MUX 17 (sets output 98 true) and measures the elapsed time of the ramp-down period from the internal timer 104 at step 330. Then, at step 332, the stored motor heating value (i.e., the voltage of capacitor 122) is calculated from a constant (k1) times the elapsed time. Then, at step 334, if the stored motor heating value is greater than the calculated digital model, step 336 is executed to output a relatively short pulse width on the output 116 to the thermal memory 114. In this manner, the resistor 124 discharges the thermal memory capacitor 122. On the other hand, if the motor heating is less than or equal to the digital model, the output 116 is pulsed with a relatively long pulse width at step 338 in order to increase the charge on the capacitor 122.

Figure 5C:
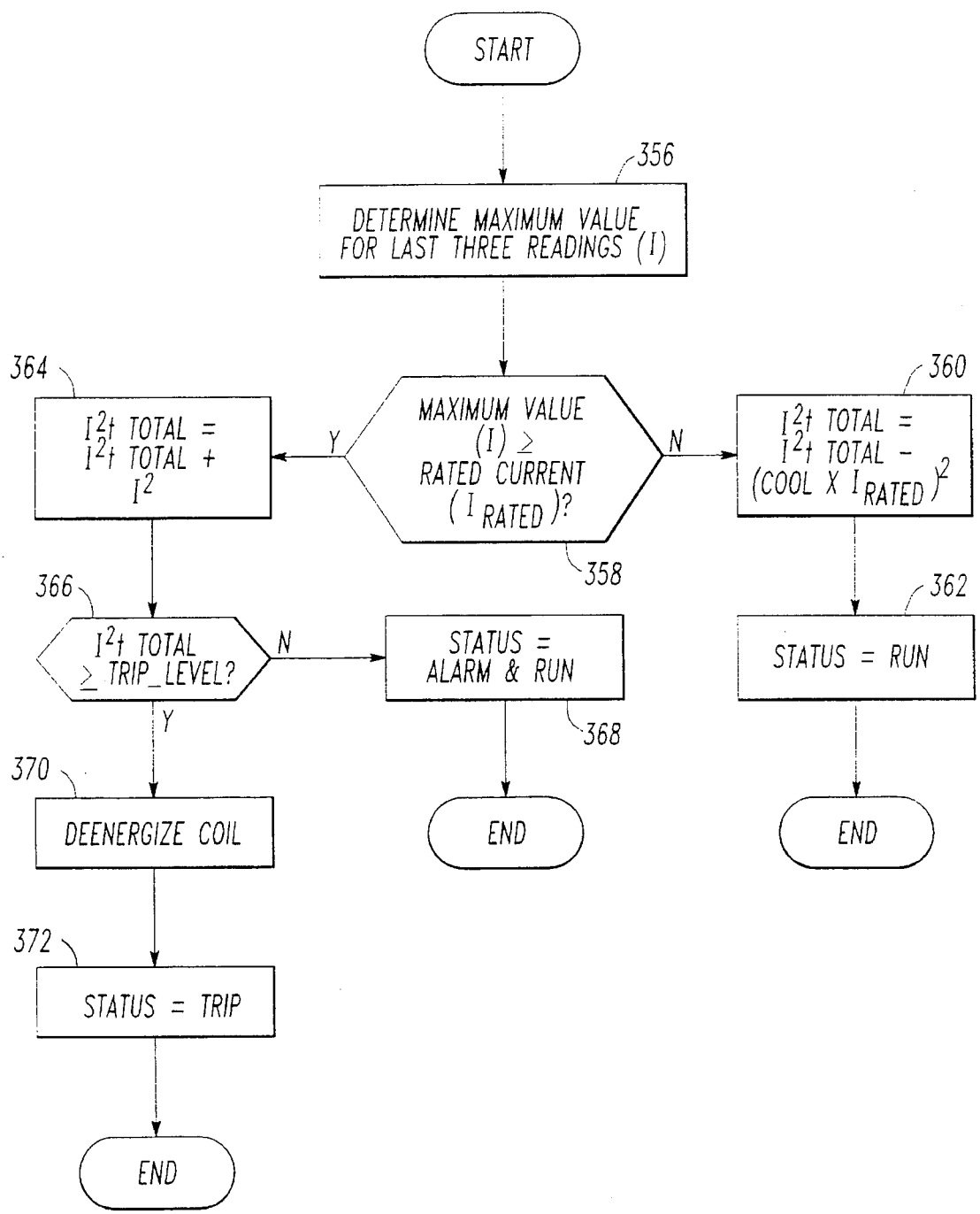
FIG. 5C is a flowchart of microcomputer firmware for selectively opening separable contacts as a function of the current values in accordance with the invention.

FIG. 5C illustrates another flowchart of firmware for the μC 19 of FIG. 2A for selectively opening the separable contacts 14 as a function of the current values. As discussed above with FIG. 5A, the μC 19 determines the sensed current values $I_A, I_B, I_C$ for the separable contacts 14 and, in turn, uses the digital output 213 to output the control signal 34 on line 36 to the coil drive circuit 20 in order to disconnect the power source 6 from the load 8 whenever any one of the sensed current values $I_A, I_B, I_C$ is above a predetermined current value. At step 356, a maximum value (I) of the three previous readings of the sensed current values $I_A, I_B, I_C$ is determined. Then, at step 358, the maximum value (I) is compared to a rated current ($I_{RATED}$). If I is less than $I_{RATED}$, then at step 360, an $I^2t$ TOTAL is updated by subtracting a factor, $(COOL \times I_{RATED})^2$, which reflects a cooling of the motor 8. At step 362, a status mode (STATUS) is set to a RUN condition and the routine exits. On the other hand, if I is greater than or equal to $I_{RATED}$, then at step 364, the $I^2t$ TOTAL is updated by adding a factor, $(I)^2$, which reflects a heating of the motor 8. At step 366, the $I^2t$ TOTAL is compared to a TRIP_LEVEL value. If the $I^2t$ TOTAL is less than the TRIP_LEVEL, then the status mode (STATUS) is set to an ALARM & RUN condition at step 368 before the routine exits. Otherwise, if the $I^2t$ TOTAL is greater than or equal to the TRIP_LEVEL, then output 213 is used to deenergize the coil 16 at step 370. Finally, at step 372, the status mode (STATUS) is set to a TRIP condition and the routine exits.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A circuit interrupter apparatus for selectively connecting a power source to a load, said apparatus comprising:

electromagnetic means having separable contact means and coil means, the separable contact means for selectively connecting said power source to said load, the coil means being energized to close the separable contact means and to hold the separable contact means closed;

power supply means for supplying coil current to energize the coil means;

switching means for selectively switching the coil current to the coil means, said switching means being controlled by an input;

pulse width modulation means having an input with an electrical signal and an output with a switching signal connected to the input of said switching means, said pulse width modulation means for controlling said switching means with the switching signal which has an off state with a variable period and an on state with a variable period, the electrical signal having a magnitude which modulates the variable period of the on state, the magnitude having a first value which produces a first period of the on state in order to provide a first value of the coil current to the coil means which pull-ins and closes the separable contact means, the magnitude having a second value which produces a second period of the on state in order to provide a second value of the coil current to the coil means which holds the separable contact means closed, and the magnitude having a third value which produces a third period of the on state in order to provide a third value of the coil current to the coil means which opens the separable contact means; and control means for controlling the magnitude of the electrical signal of the input of said pulse width modulation means.

2. The circuit interrupter apparatus as recited in claim 1 wherein said pulse width modulation means produces the third period of the on state, the third period being generally zero in order to constantly produce the off state and in order to produce the on state with a zero length period and, in turn, to provide the third value of the coil current which is about zero.

3. The circuit interrupter apparatus as recited in claim 1 wherein the electrical signal of the input of said pulse width modulation means is a binary signal having a first state and a second state, the first state corresponding to the first and second values of the magnitude of the electrical signal in order to constantly produce the on state and to produce the off state with a zero length period in order to constantly enable the coil current to the coil means, the second state corresponding to the third value of the magnitude of the electrical signal in order to constantly disable the coil current to the coil means; wherein said switching means is in series with the coil means; and wherein said power supply means includes:

a power source;

a capacitor in parallel with said switching means and the coil means, the power source charging the capacitor which supplies the first value of the coil current to the coil means; and a resistor in series with the coil means interconnected between the power source and the capacitor, the resistor limiting the coil current which flows from the power source to the second value of the coil current which is less than the first value of the coil current.

4. The circuit interrupter apparatus as recited in claim 1 wherein said control means further includes generation means for generating a magnitude profile for the input of said pulse width modulation means, the magnitude profile having a plurality of values including the first value of the magnitude, the second value of the magnitude which is different from the first value of the magnitude, and at least one other value of the magnitude which is between the first and second values thereof.

5. The circuit interrupter apparatus as recited in claim 1 wherein the coil means has an electrical parameter; and wherein said pulse width modulation means further includes feedback means for adjusting the magnitude of the electrical signal as a function of the electrical parameter.

6. The circuit interrupter apparatus as recited in claim 5 wherein said power supply means further supplies a voltage to the coil means; and wherein the electrical parameter is the voltage supplied to the coil means.

7. The circuit interrupter apparatus as recited in claim 5 wherein the feedback means includes a resistor in series with the coil means, the resistor having a voltage produced thereacross by the coil current which flows therethrough; and wherein the electrical parameter is the voltage of the resistor.

8. A circuit interrupter apparatus for selectively connecting an alternating current (AC) power source having a periodic waveform with a generally fixed period to a load, comprising:

separable contact means interconnected between said power source and said load for switching a load current which flows from said power source and through said separable contact means;

dual-slope conversion means for sensing the load current and generating a current value, said dual-slope conversion means including: current transformer means for sensing the load current and providing a received current, preamplifier means for buffering the received current and providing a buffered current, the preamplifier means having a bias voltage, dual-slope integration means for generating the current value from the buffered current, bias means for biasing the current transformer means with a voltage which is about equal to the bias voltage of the preamplifier means, wherein the dual-slope integration means positively integrates the buffered current for an integral multiple of the generally fixed period; and control means for selectively opening said separable contact means as a predetermined function of the current value in order to disconnect said power source form said load, said load control means including: charging means having an input and an output, the input for receiving an AC control voltage, the output for producing a charging current, diode means having an output for providing a synchronization signal, a capacitor connected between the output of the charging means and the diode means, the charging current charging the capacitor and passing through the diode means, timing means having an input connected to the output of the diode means for receiving the synchronization signal, the timing means for controlling the integral multiple of the generally fixed period of the dual-slope integration means.

* * * * *